US008910371B2

(12) United States Patent
Kleber et al.

(10) Patent No.: US 8,910,371 B2
(45) Date of Patent: Dec. 16, 2014

(54) METHOD FOR FABRICATING AN INDUCTION ROTOR

(75) Inventors: Richard M. Kleber, Clarkston, MI (US); Thomas A. Perry, Bruce Township, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 13/037,040

(22) Filed: Feb. 28, 2011

(65) Prior Publication Data

US 2012/0217838 A1 Aug. 30, 2012

(51) Int. Cl.
| | | |
|---|---|---|
| *H02K 15/12* | (2006.01) | |
| *H02K 15/00* | (2006.01) | |
| *H02K 17/16* | (2006.01) | |
| *H02K 15/09* | (2006.01) | |

(52) U.S. Cl.
CPC .......... *H02K 15/0012* (2013.01); *H02K 17/165* (2013.01)
USPC .............. 29/596; 29/598; 29/592.1; 310/211; 310/43; 310/45

(58) Field of Classification Search
CPC ............................... H02K 15/12; H02K 15/09
USPC ........ 310/211, 43, 45; 29/598, 608, 609, 596, 29/592.1
IPC ........................................... H02K 15/12, 15/09
See application file for complete search history.

(56) References Cited

U.S. PATENT DOCUMENTS

| | | | | |
|---|---|---|---|---|
| 2,643,350 | A | | 6/1953 | Merrill |
| 3,670,238 | A | * | 6/1972 | Ronk ............................ 310/211 |
| 3,871,069 | A | * | 3/1975 | Grieb ............................. 29/598 |
| 4,158,225 | A | * | 6/1979 | Hertz ............................ 310/211 |
| 5,304,877 | A | * | 4/1994 | Baek ............................. 310/211 |
| 2005/0134137 | A1 | * | 6/2005 | Sweo ............................. 29/598 |
| 2009/0079289 | A1 | * | 3/2009 | Lang et al. .................... 310/214 |
| 2010/0007234 | A1 | * | 1/2010 | Alfermann et al. ........... 310/211 |
| 2010/0243197 | A1 | * | 9/2010 | Osborne et al. ............... 310/211 |

FOREIGN PATENT DOCUMENTS

| | | |
|---|---|---|
| CN | 201312153 Y | 9/2009 |
| DE | 16849 A1 | 5/1959 |
| DE | 23391 A1 | 7/1962 |
| DE | 2214668 A | 10/1973 |
| DE | 19818774 C1 | 11/1999 |
| DE | 19829053 A1 | 12/1999 |
| DE | 10345637 A1 | 5/2005 |

(Continued)

OTHER PUBLICATIONS

Machine translation of DE 10 2009 008 440 B3 (published Dec. 2, 2010, translated May 6, 2013).*

(Continued)

*Primary Examiner* — Michael Andrews

(57) ABSTRACT

A rotor for an induction motor includes a rotor core having first and second ends and a plurality of conductor bars. Each conductor bar has a respective first end extending beyond the first end of said rotor core. Each first exposed end has a respective enclosed opening. The rotor also includes an end ring comprising a casting of material flowed between the respective first ends of the conductor bars and through the respective closed openings.

15 Claims, 2 Drawing Sheets

(56) References Cited

FOREIGN PATENT DOCUMENTS

| DE | 102005030377 A1 | 1/2007 | | |
|----|-----------------|--------|---|---|
| DE | 10 2009 014 460 A1 | 10/2010 | | |
| DE | 10 2009 008 440 B3 | 12/2010 | | |
| DE | 102009008440 B3 * | 12/2010 | ............. | H02K 15/02 |

OTHER PUBLICATIONS

U.S. Appl. No. 12/691,217, Wang.
U.S. Appl. No. 12/954,115, Gerard.
U.S. Appl. No. 12/954,080, Gerard.
U.S. Appl. No. 12/872,036, Osborne.
U.S. Appl. No. 13/032,771, Wang.
U.S. Appl. No. 13/033,905, Kleber.
Bala, C., Fetita, Al., Lefter, V: Handbuch der Wickeltechnik elektrischer Maschinen. 2. Auflage. Berlin: Verlag Technik, 1976. 304, 305, 316, 317.—ISBN n.b.
Schuisky, W., Induktionsmaschinen. Wien: Springer-Verlag, 1957. pp. 49-68, 153-158, 462-466, Dec. 1957.

* cited by examiner

METHOD FOR FABRICATING AN INDUCTION ROTOR

TECHNICAL FIELD

This disclosure is related to electrical power motors.

BACKGROUND

The statements in this section merely provide background information related to the present disclosure and may not constitute prior art.

Electric motors can convert electric energy to mechanical energy and convert mechanical energy to electrical energy. Known electric motors are connected to an energy storage device thereby enabling the transfer of energy therebetween. Induction machines utilize single-phase or multi-phase power to produce a rotating magnetic field through a series of stators to turn a rotor. The rotating magnetic field induces electrical current through a plurality of conductive bars in the rotor. The electrical current in the conductive bars reacts with the magnetic field produced by the stators to create rotation in the rotor thereby creating mechanical energy in the form of torque.

The stators include a plurality of paired poles that are created from a series of windings and are distributed around the rotor. A common rotor type is referred to as a squirrel-cage rotor. The rotor portion is a laminated structure with bars connected through end rings. The squirrel-cage rotor has a generally cylindrical shape that includes a plurality of conductive bars along a length of a lamination stack at an outer perimeter. The plurality of conductive bars is preferably made of copper due to thermal and conductive properties but other materials, such as aluminum, can be used. The bars in the squirrel-cage are connected at their ends by two end rings. The rotor is assembled by a series of electrically conductive steel laminations through the center of the rotor until it is capped at both ends by shorting rings. The end rings hold the bars and the lamination stack together. The lamination stack is the primary flux-carrying member while the bars carry the current to generate the magnetizing force.

Known rotor fabrication methods include assembling the laminated steel stack with conductor bars on an outer periphery of the rotor and shorting end rings on the ends thereof. This may include placing the laminated steel stack into a casting mold. Molten material is introduced into open spaces formed in the rotor and open spaces between the die cast mold and the laminated steel stack to form the shorting end rings and conductor bars. It is known that oxide inclusions and voids may be formed in the conductor bars and shorting end rings during mold filling of molten material and solidification. The molten material may cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars and mass bulk density of the individual conductor bars. It is known that voids formed in the conductor bars and the shorting end rings during fabrication reduce power density output of the electric induction motor. The presence of oxide occlusions and cracks due to hot tearing reduces the electric conductivity of the conductor bars and shorting end rings, thereby reducing the power density output of the motor.

The use of copper material for conductor bars may increase power density and heat transfer characteristics of an induction motor as compared to an induction motor using aluminum conductor bars. The use of aluminum shorting end rings may be cast easier than using a cast copper shorting end ring while providing acceptable heat transfer properties. Known use of copper material for conductor bars and shorting end rings increases manufacturing process times and complexity as compared to aluminum conductor bars and shorting end rings. Known manufacturing processes include casting both the conductor bars and shorting end rings from the same material and welding or brazing conductor bars to shorting end rings.

SUMMARY

A rotor for an induction motor includes a rotor core having first and second ends and a plurality of conductor bars. Each conductor bar has a respective first end extending beyond the first end of said rotor core. Each first exposed end has a respective enclosed opening. The rotor also includes an end ring comprising a casting of material flowed between the respective first ends of the conductor bars and through the respective closed openings.

BRIEF DESCRIPTION OF THE DRAWINGS

One or more embodiments will now be described, by way of example, with reference to the accompanying drawings, in which.

DETAILED DESCRIPTION

Figure 1:
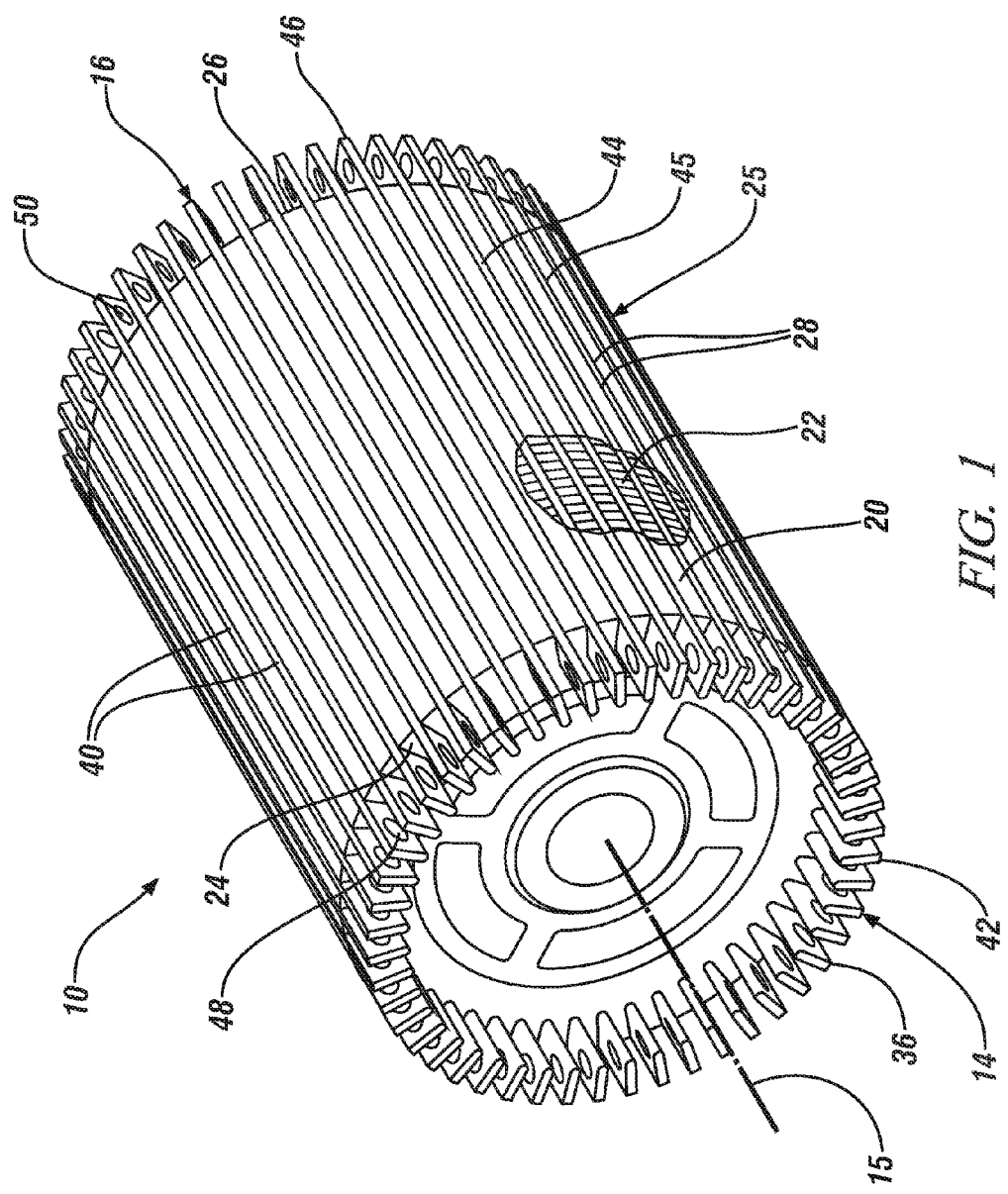
FIG. 1 illustrates an isometric view of a partially assembled rotor assembly for an induction motor, in accordance with the present disclosure.

Referring now to the drawings, wherein the showings are for the purpose of illustrating certain exemplary embodiments only and not for the purpose of limiting the same, FIG. 1 illustrates an isometric view of an induction rotor assembly 10 for an induction motor. The induction motor may be any induction motor, including an induction motor for use on a powertrain system for a motor vehicle. The rotor assembly 10 is fixedly attached to a rotor shaft centered upon an axis of rotation 15 using any suitable means, e.g., shrink fit and lock-and-key torque fitting, as is commonly known in the art. It is appreciated that the rotor assembly 10 may be assembled onto the rotor shaft subsequent to rotor assembly. The rotor assembly 10 and the rotor shaft share the same axis of rotation 15.

The rotor assembly 10 includes a first end 14 and a second end 16. The rotor assembly 10 is configured to be assembled into and rotate within a stator of an induction motor.

The rotor assembly 10 includes a rotor core 20, preferably an assembled cylindrically-shaped steel laminate stack, and a plurality of longitudinally-oriented conductor bars 40. The rotor core includes first and second ends 24, 26 and the conductor bars 40 are peripherally disposed through the rotor core with exposed ends extending beyond the ends of the rotor core. The first end 24 of the rotor core 20 corresponds to the first end 14 of the rotor assembly 10 and the second end 26 of the rotor core 20 corresponds to the second end 16 of the rotor assembly 10.

The rotor core 20 is fabricated from a plurality of thin laminate sheets 22 formed from ferric material. In one embodiment the laminate sheets 22 are 0.33 mm (0.013 inches) thick. The laminate sheets 22 are stamped using a fine blanking process and are preferably electrically insulated to minimize eddy currents. Each laminate sheet 22 is a flat annular-shaped device and includes a plurality of radially-oriented apertures formed near an outer periphery thereof. When the laminate sheets 22 are assembled into the rotor core 20, the radially-oriented apertures are aligned to form grooves 28 that may be longitudinally-oriented parallel with the axis of rotation 15 of the rotor and are at an outer periphery 25 of the rotor core 20. Alternatively, the grooves 28 may include an acute angle in relation to the axis of rotation 15. The grooves 28 and the conductor bars 40 therein will be discussed as longitudinally-oriented; however, this orientation is understood to include either an alignment that is parallel to the axis of rotation 15 or including an acute angle from parallel with respect to the axis of rotation 15. The grooves 28 may have any suitable cross-sectional shape, and are substantially rectangular-shaped in one embodiment. The longitudinally-oriented grooves 28 are periodically spaced around the periphery 25, i.e., evenly or varying the spacing in an uneven manner. Conductor bars 40 are each carried within one of the grooves 28. As is appreciated, the laminate sheets 22 are assembled onto the axis of rotation 15 in a laminated fashion using any suitable fabricating method.

The conductor bars 40 are preferably fabricated from copper-based materials and are introduced into each of the grooves 28 by any suitable process, including, e.g., insertion or molding. Alternatively, the conductor bars 40 may be fabricated from aluminum-based or similar electrically conductive materials. The conductor bars 40 are disclosed to include features at each of a first end and second end of the conductor bars. It will be appreciated that the bars could include the features described on the first end only with different features according to another method utilized at the second end. Each conductor bar 40 includes a first exposed portion 42, a main portion 44, and a second exposed portion 46, and each has a peripheral edge 45. The first exposed portion 42 projects beyond the first end 24 of the rotor core 20 and includes an enclosed opening 48. The second exposed portion 46 projects beyond the second end 26 of the rotor core 20 and includes an enclosed opening 50. Each of the enclosed openings 48, 50 are a circular shaped opening in one embodiment although other shapes, e.g., rectangular or star pattern, can be utilized. The main portion 44 is secured within the grooves 28 formed in the rotor core 20. The peripheral edge 45 of each conductor bar 40 projects through the grooves 28 on the periphery 25 along the main portion 44, and further projects along the first and second exposed portions 42 and 46. It will be recognized that the conductor bars 40 can have a parallel relation with the axis of rotation of the rotor shaft or may form an acute angle with the axis or rotation of the rotor shaft.

Figure 2:
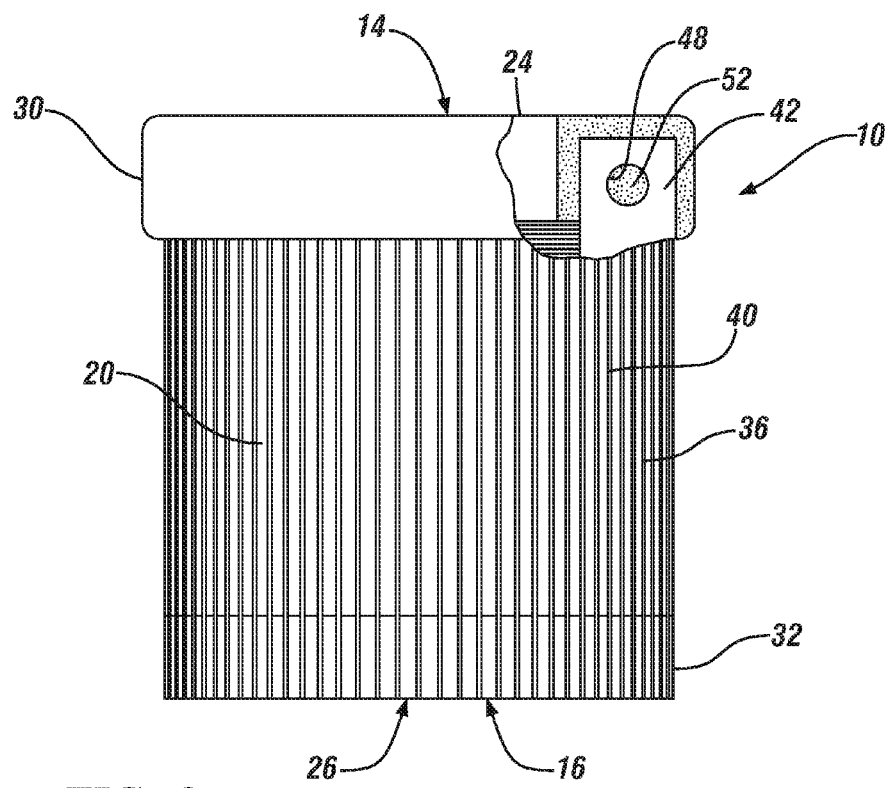
FIG. 2 illustrates a rotor assembly for an induction motor with a rough casting and partial section view of shorting end ring on the first end and a finished machined casting of shorting end ring on the second end, in accordance with the present disclosure.

FIG. 2 illustrates a rotor assembly 10 for an induction motor with a rough casting and partial section view of shorting end ring 30 on the first end 14 and a finished machined casting of shorting end ring 32 on the second end 26. Each of the annular-shaped shorting end rings 30, 32 is preferably cast in place from aluminum-based materials. Alternatively, the shorting end rings 30, 32 may be cast from copper-based or other electrically conductive materials. Each shorting end ring 30, 32 is cast in place at an end of the laminate stack 20 by inserting the rotor assembly 10 into a die or mold and introducing molten material to the first and second ends 14, 16 through any known casting process. Both the first and second ends 14, 16 undergo the same process. Therefore, the process will be discussed in terms of the first end 14 as exemplary.

The molten material flows into the die and fills the cavity created by the die including the voids between the first exposed portions 42 of the conductor bars 40 and to the first end 24 of the rotor core 20. The molten material flows through and fills the enclosed openings 48 of the conductor bars 40 as the die becomes filled. It may be desirable to preheat the rotor assembly, such as in an industrial oven or induction heating apparatus, prior to casting molten material to promote casting integrity by preventing quenching of the molten material as it contacts the exposed ends and rotor core. The molten material creates a metallurgical bond with the conductor bars 40 and cools to form the shorting end ring 30 as a monolithic casting. The shorting end ring 30 includes a portion that extends through each of the conductor bars 40 at the enclosed openings 48 to create a mechanical interlock 52 at the enclosed opening 48. The mechanical interlock 52 forms an interlock between the shorting end ring 30 and the conductor bars 40. The mechanical interlock 52 cross section can be adjusted for shear strength based on the size of the enclosed opening 48, i.e., shear strength of the mechanical interlock 52 can be increased by increasing the amount of material in the enclosed openings 48.

The mechanical interlock 52 can also be adjusted for directional strength corresponding to the direction of high stress, i.e., the enclosed opening 48 can be elongated in the direction with the highest stress under operating conditions. Additionally, the enclosed opening 48 can be optimized for electrical conductivity between the conductor bars 40 and the shorting end ring 30, i.e., the enclosed opening can have a shape, e.g., star pattern, that increases surface area contact between the conductor bar 48 and the shorting end ring 30. It will be recognized that although the enclosed opening 48 is discussed as being present on each of the conductor bars 40 a more limited number of conductor bars 40 can include the enclosed opening 48, e.g., one-half and one-third of the conductor bars 40 can have the enclosed opening 48.

The rotor assembly 10 is removed from the die and machined to remove over-cast material that occurs during the casting process. The shorting end ring 30 has the over-cast material removed and may expose the peripheral edge 45 of the conductor bars 40 and the end of the first exposed portion 42 of the conductor bars 40 as depicted by shorting end ring 32. It will be recognized that a net-zero die cast process, a process that does not require machining after casting, may also be utilized. As a result, shorting end rings 30 and 32 include an axis of rotation coincident to rotor assembly 10, the rotor shaft, and rotor core 20.

Figure 3:
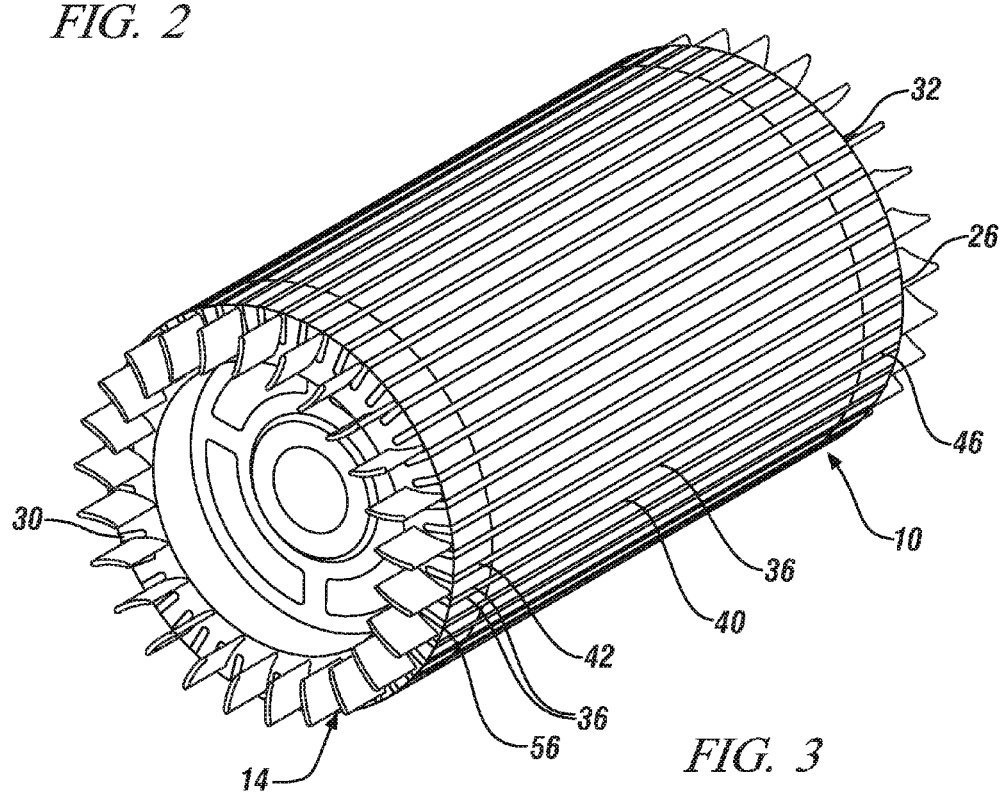
FIG. 3 illustrates a rotor assembly with finished castings of shorting end rings that includes a plurality of cast-in heat sinks, in accordance with the present disclosure.

Heat is generated in the motor during operation. Heat can be transferred away from the motor according to a number of methods. A liquid coolant can be used to cool the motor. In the alternative, air can be used to cool the motor. FIG. 3 illustrates a rotor assembly 10 with finished castings of shorting end rings 30, 32 that includes a plurality of cast-in heat sinks 56. The heat sinks 56 can be utilized in air-cooled motors and can be extensions of the end rings 30, 32 repeated evenly around the circumference of the first and second ends 14, 26, respectively. The heat sinks 56 transfer heat generated by a spinning rotor assembly 10 from the first and second ends 14, 26 to each of the plurality of heat sinks 56. The heat sinks 56 provide additional surface area to transfer absorbed heat to passing air as the rotor assembly 10 spins. The heat sinks 56 may be located on either the first and second end rings 30, 32 or both first and second end rings 30, 32. The heat sinks 56 are directly cast in place when a net-zero die cast process is used and are machined in when over-casting of material is used.

A bonding agent 36 may be applied as a surface treatment to the each of the conductor bars 40 for creating a more robust metallurgical bond between the conductor bars 40 and the shorting end rings 30, 32. In one embodiment, the bonding agent 36 can be a flux material, as is known in the art, applied to conductor bars 40. The flux material removes oxides that can form on the conductor bars 40 and during the rapid cooling of the molten material thereby creating a better metallurgical bond between the conductor bars 40 and the shorting end rings 30, 32. In another embodiment, the bonding agent 36 can be an intermediate element, e.g., tin, applied to conductor bars 40. Exemplary intermediate elements include low melting points and preferred reactions with the materials of the conductor bars 40 and the shorting end rings 30, 32 according to material properties known in the art. The bonding agent 36 can be applied to the entire conductor bar 40 or only the first and second exposed portions 42, 46. By applying a bonding agent 36 to the conductor bars 40 prior to casting the shorting end rings 30, 32, the power density output of the motor can be maintained or improved.

The separation of the end rings 30, 32 from the conductor bars 40 is restrained by both, the mechanical interlock 52 and the metallurgical bond between the shorting end rings 30, 32 and the conductor bars 40. The combination of the mechanical interlock 52 and the metallurgical bond create a total bond. The required strength of the total bond is determined to avoid separation of the end rings from the bars as the inertia increases at high motor speeds.

The above method to cast a shorting end ring onto a rotor can be used on one or both ends of the rotor.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for fabricating a rotor for an induction motor, comprising:
    providing an induction rotor assembly comprising a rotor core having first and second ends, and a plurality of conductor bars disposed within grooves at an outer periphery of the rotor core, each conductor bar having a respective first exposed end extending beyond the first end of said rotor core, each first exposed end having a respective enclosed opening;
    casting a first flow of molten material to form a first shorting end ring only extending away from the first end of the rotor core in a direction axially outward from the rotor core, the first flow of molten material partially flowing in a direction axially inward from the first end and terminating to form an overcast that terminates adjacent to the first end in the direction axially inward from the first end, wherein the molten material flows between said first exposed ends and through said respective enclosed openings in forming the first shorting end ring, thereby creating a mechanical interlock between the first shorting end ring and the conductor bars;
    preheating the rotor assembly prior to the casting of the molten material to form the first shorting end ring; and
    machining the overcast to form the first shorting end ring only extending away from the first end of the rotor core in a direction axially outward from the rotor core.

2. The method of claim 1, wherein said each conductor bar has a respective second exposed end extending beyond the second end of said rotor core, each second exposed end having a respective enclosed opening; and further comprising casting molten material to form a second shorting end ring on the second end of the rotor, the molten material flowing between said second exposed ends and through said respective enclosed openings in forming the second shorting end ring, thereby creating a mechanical interlock between the second shorting end ring and the conductor bars.

3. The method of claim 1, further comprising surface treating said first exposed ends of said conductor bars prior to casting of the molten material to form the first shorting end ring.

4. The method of claim 3, wherein surface treating comprises applying an intermediate element to promote bonding between said first exposed ends and the molten material forming the first shorting end ring.

5. The method of claim 3, wherein surface treating comprises applying a flux material to remove oxides during the casting of the molten material to form the first shorting end ring.

6. The method of claim 3, wherein surface treating said first exposed ends comprises surface treating all of each conductor bar.

7. The method of claim 1, wherein each conductor bar comprises a copper material.

8. The method of claim 1, wherein each conductor bar comprises an aluminum material.

9. The method of claim 1, wherein the molten material comprises an aluminum material.

10. The method of claim 1, wherein the molten material comprises a copper material.

11. The method of claim 1, further comprising casting said molten material into a plurality of heat sinks.

12. The method of claim 1, further comprising machining said molten material subsequent to cooling into a plurality of heat sinks.

13. The method of claim 1, wherein the conductor bars have an acute angle relationship with an axis of rotation of the rotor.

14. The method of claim 1, wherein said plurality of conductor bars comprises all conductor bars of said induction rotor assembly.

15. The method of claim 1, wherein each of said plurality of conductor bars is spaced periodically around a circumference of the rotor core.

* * * * *